MEMORY SYSTEMS

Filed March 23, 1960

INVENTOR
EDWIN J. SLOBODZINSKI
BY Mitchell & Bechert
ATTORNEY 3,105,958
Patented Oct. 1, 1963

3,105,958

MEMORY SYSTEMS

Edwin J. Slobodzinski, Hopewell Junction, N.Y., assignor to International Business Machines Corporation, New York, N.Y., a corporation of New York Filed Mar. 23, 1960, Ser. No. 17,215
3 Claims. (Cl. 340—173)

The present invention relates to memory systems which are susceptible of non-destructive read-out, and more particularly to such systems which are especially useful in alternating current, including microwave, applications.

In all memory systems, it is necessary to be able to recover (read-out) the information stored (read-in), if such information is to serve a useful purpose. Often, the reading out of information results in the elimination of that information from the memory system. This is known as destructive read-out. In many instances, it is desirable to be able to read out information without the resultant elimination of that information. Such non-destructive read-out is useful, for example, where the information is to be repeatedly utilized.

It is an object of the present invention to provide a memory system which provides for non-destructive read-out.

It is a further object of the present invention to provide such a memory system wherein read-out may be derived in terms of high frequency, alternating current signals, whereby the system may be employed in microwave applications.

For achieving these objects, the invention provides a memory circuit which utilizes as its memory cell a bistable electrical element having a voltage-current relationship which is characterized by a negative resistance region between two positive resistance regions, the second derivatives (or rates of change of slope) of the positive resistance regions being opposite in sign, and the element being stable in either of its positive resistance regions. A circuit element which possesses these characteristics is a semiconductor diode which is variously known as an Esaki or tunnel diode. A description of this diode element may be found on page 1201 in the July 1959 issue of the Proceedings of the Institute of Radio Engineers.

In a memory circuit in accordance with the invention, circuit means are provided wherein read-in is effected by switching the above-described bistable electrical element from one of its stable states to the other. Read-out is then achieved by voltage means connected to apply an alternating current read-out voltage difference across the element, and by sensor means responsive to harmonic current through the element.

A complete understanding of the invention may be obtained from the following detailed description of means forming specific embodiments thereof, when read in conjunction with the appended drawings, in which.

The various characteristics of a tunnel diode which are of interest with respect to the present invention may best be described with reference to FIG. 1. In the voltage-current chart shown therein, the abscissa represents the voltage across the diode and the ordinate represents the current through the diode. It is thus seen that, initially, as the voltage across the diode increases, the current through the diode also increases. The internal characteristics of the diode determine the linearity of this region of the curve and it may vary substantially with different diodes. However, within such variation, this first region of the voltage-current characteristic is a positive resistance region wherein the positive resistance increases with applied voltage.

After reaching a first critical voltage value $C_1$, further increasing the voltage results in decreasing the current through the diode. This second region, therefore, has a negative resistance characteristic.

Thereafter, the voltage-current relationship reverses itself upon reaching the critical voltage value $C_2$. Further increasing the voltage beyond that point results in increasing the current through the diode in an exponential fashion. This third region, therefore, has a positive-resistance characteristic wherein the positive resistance decreases with applied voltage.

Figure 1:
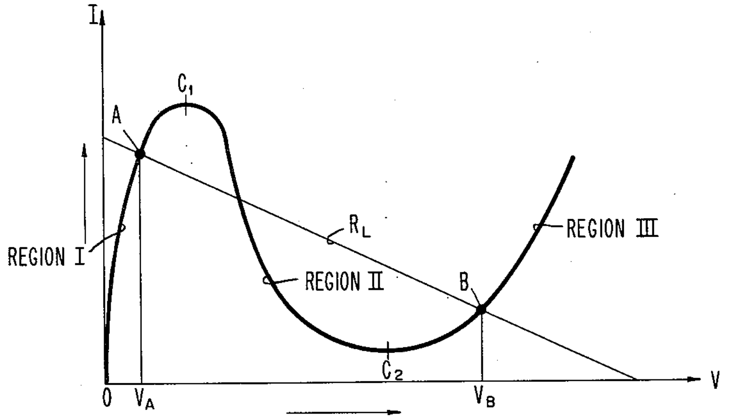
FIG. 1 is a chart showing the typical voltage-current relationship of a tunnel diode.
Figures 2, 3:
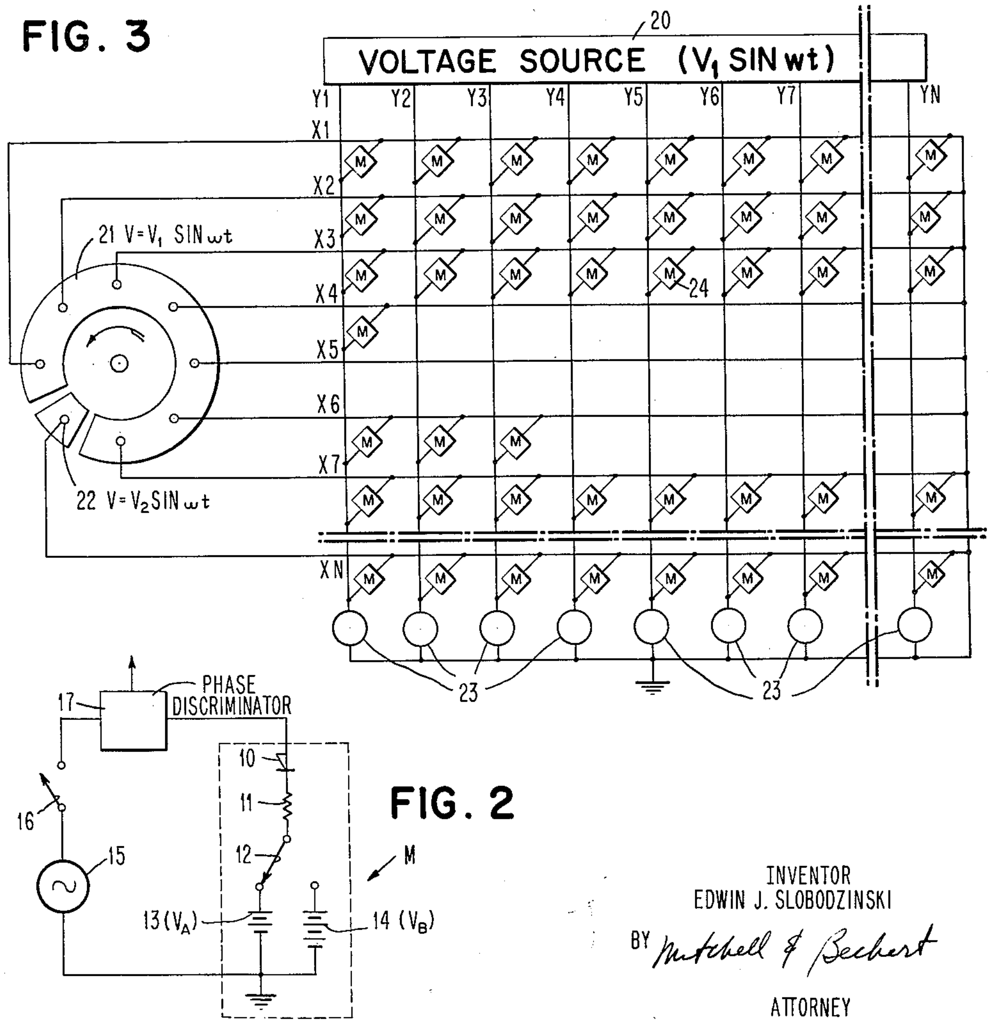
FIG. 2 is a schematic diagram of a memory circuit in accordance with the invention.
FIG. 3 is a schematic diagram of a memory matrix in accordance with the invention.

The voltage-current chart of FIG. 1 permits a visual presentation of the operation of the memory circuit of the present invention. An example of a memory circuit in accordance with the invention is illustrated in FIG. 2. The circuit comprises a tunnel diode 10 and a resistor 11 connected in series relationship. The resistor 11 serves as a load for the diode 10 and has a pre-selected value ($R_L$) determinable by design considerations.

The effect which the load resistor 11 has upon the operation of the diode 10 may be represented on the chart of FIG. 1 by means of a load line having a slope which is determined by the value $R_L$ of the resistor. This load line intersects the positive resistance regions I and III of the voltage-current characteristic of the diode at the points A and B, respectively. Due to phenomena inherent in the tunnel diode, the circuit of FIG. 2 may be shown to possess operative stability at these two points.

Let it be assumed, then, that the diode in the circuit of FIG. 2 is biased to the point A on its voltage-current characteristic and that a sinusoidal voltage is impressed across the circuit. Since region I of the diode characteristic is generally somewhat non-linear, a current which contains harmonics of the applied voltage will be generated in the circuit. The amplitude of these harmonics will be proportional to the degree of non-linearity of the region I at the point A. Furthermore, the phase of these harmonics will be determined by the second derivative, or rate of change of slope, at the point A. It might be noted that this second derivative, and consequently the phase of the harmonics, has the same sign at any point on the region I of a tunnel diode characteristic.

Similarly, when the diode 10 is biased to its second stable position at point B, the application of a sinusoidal voltage across the circuit results in the generation of harmonic currents. In this case, the amplitude of the harmonics is dependent upon the degree of non-linearity of the region III at the point B. Also the phase of the harmonics is determined by the rate of change of slope at the point B. (Again, note that the second derivative has the same sign at any point on the region III of a tunnel diode characteristic.)

Two important differences exist between the harmonics generated at the points A and B. The first derives from the fact that the second derivative of region I is opposite in sign to the second derivative of region III. Accordingly, the phase of the harmonics generated with the circuit biased to point B will be opposite to (180° displaced from) the phase of the harmonics generated with the circuit biased to point A. The second derives from the fact that, in general, the region III will be substantially more non-linear than the region I. Thus, a relatively larger harmonic output will normally be produced when the circuit is biased to point B than will be produced when the circuit is biased to point A.

With the above as a background, the operation of the circuit of FIG. 2 as a memory circuit may now be described. In accordance with the invention, the circuit stores information in terms of the stable state into which the diode 10 is biased. Thus, for example, the circuit may be utilized to store the binary digit "0" by being adapted to bias the diode into its first stable condition at point A in response to a "0" input, or to store the binary digit "1" by being adapted to bias the diode into its second stable condition at point B in response to a "1" input. In FIG. 2, such adaptation is shown symbolically by means of a switch 12, a first direct-current voltage source 13 providing a voltage $V_A$, and a second direct-current voltage source 14 providing a voltage $V_B$. Binary information may then be read into the memory circuit by selectively connecting either the source 13 or the source 14 to the circuit through the medium of the switch 12, depending upon whether the digit "0" or the digit "1," respectively, is to be stored in the circuit. The read-in means for switching the memory circuit from one of its stable states into the other may, of course, take other more sophisticated forms well known in the art.

More than just the ability to store information is required of a memory circuit. In order to serve a useful purpose, the circuit must also be able to give on demand an indication of the information stored therein. In the present invention, such read-out may be accomplished non-destructively by the application of a sinusoidal voltage across the memory circuit. Thus, for example, the read-out current means may comprise an alternating-current voltage source 15 connected across the memory circuit through a switch 16 which is closed when read-out is desired.

This alternating-current voltage produces a current flow through the memory circuit, the waveform of which differs in accordance with the stable condition (that is to say, the stored information) of the memory circuit. Detection of such difference, therefore, provides the required indication as to the nature of the stored information. The difference, it will be recalled, lies in the phase and/or amplitude of the harmonic content of the current produced by the impressed sinusoidal voltage. Detection of this difference may accordingly be effected by means of well known harmonic sensing units.

Inasmuch as it has been found in practice to be, at present, extremely difficult to produce tunnel diodes having a substantially linear characteristic in region I, it is considered preferable to rely on the phase relationship rather than the amplitude of the harmonic currents for read-out. Moreover, since the second harmonic will be the strongest, only the phase relationship of this component need be considered. Consequently, read-out may be accomplished by means of a simple sensing unit 17, such as a phase discriminator. If amplitude read-out is desired, it may be accomplished merely by providing voltage indicating means tuned to the second harmonic.

The alternating-current voltage applied across the memory circuit of FIG. 2 is of insufficient magnitude to switch the state of the diode 10. Consequently, the read-out provided is non-destructive in nature. Furthermore, the read-out is effected by the application and detection of alternating current parameters. Accordingly, the memory circuit of the invention may be employed in alternating current, including microwave, applications.

One manner in which the memory circuit may be employed in microwave applications is illustrated in FIG. 3. A matrix is formed of a plurality of conductive lines Y1–YN and of conductive lines X1–XN. Each of the Y conductive lines is connected to each of the X conductive lines through an individual memory circuit M for each connection. Each of the memory circuits may be like that shown in FIG. 2 without the read-out circuitry comprising source 15, switch 16 and sensor 17. In that way, a separate memory circuit M bridges each crossing of an X and a Y conductive line in the matrix.

In such a matriz, information may be stored, not only in terms of the state of the individual memory circuits, but also in terms of the positions of the memory circuits. Thus, for example, the point A state (FIG. 1) may be established as a norm for all of the memory circuits in the matrix. In that event, information would be read into the matrix by switching preselected ones of the memory circuits into the point B state.

In this example, let it be assumed that the memory circuit 24 joining lines X3 and Y4 has been switched into state B. The information represented by the switching of this memory circuit will remain stored in the matrix, available for future reference. Read-out of this stored information may then be effected in the following manner. An alternating-current voltage of a preselected frequency and amplitude, $V_1 \sin wt$, is applied to all of the Y lines by means of a voltage generator 20. The same voltage is applied to all but one of the X lines by means of a voltage generator 21. Another alternating-current voltage, $V_2 \sin wt$, having the same frequency but a different amplitude is applied to the remaining X line by means of another generator 22. Furthermore, means are provided for successively applying the voltage $V_2 \sin wt$ to different ones of the X lines while applying the voltage $V_1 \sin wt$ to the remainder of the X lines in each instance. Such means are symbolically shown in FIG. 3 by the arrow indicating rotation of the generators 21 and 22 past terminals connected to the X lines.

In this way, an alternating-current voltage difference will appear across only one set of memory circuits at any instance, that set being the one in which the memory circuits are connected to the X line to which the voltage $V_2 \sin wt$ is then being applied. The read-out circuitry is completed by connecting individual sensing means 23, which may be similar to the harmonic-sensitive sensors 17 of FIG. 2, to each of the Y lines.

Let it then be assumed that the voltage $V_2 \sin wt$ is first applied to the line XN. In that case, only the memory circuits connected to the line XN have an alternating-current voltage difference impressed thereacross. Since none of the memory circuits connected to the line XN are switched to the state B, the alternating currents produced through these memory circuits by the impressed voltage difference will contain only harmonics having a phase corresponding to the state A. As a result, none of the sensors 23 will register the detection of a switched memory circuit.

This same result is achieved when the $V_2 \sin wt$ voltage is connected to the X1 and X2 lines. However, a different output results when the $V_2 \sin wt$ voltage is connected to the X3 line since the memory circuit 24 connected between the X3 and Y4 lines has been switched to its B state. The voltage difference applied across this memory circuit, therefore, produces a current which differs from the others in that its harmonic components are 180° out of phase. As a result, the sensor 23 connected to the Y4 line provides a different indication than do the other sensor units. In this way, the location of the switched diode in the matrix is fixed, its Y coordinate being established by the sensor indication and its X coordinate by the location of the $V_2 \sin wt$ voltage at the time that the sensor indication takes place.

It should be noted that an alternating-current voltage difference may be applied across a selected row or column of memory circuits in the matrix by adapting the generator 22 to produce an alternating-current voltage which differs from the voltage produced by the generators 20 and 21 in phase rather than in amplitude. This aspect, plus the generation of harmonics provided, makes the memory system of the present invention particularly adaptable to a wide variety of alternating current applications.

For example, the matrix of FIG. 3 may be employed in a carrier wave logic machine, wherein the signal frequency may be expressed as $w_s$. In that event, the generators 20, 21 and 22 may be adapted to produce an interrogation voltage having a frequency $w_s/2$. As indicated before, detection of the switched memory circuit is effected by determination of the phase and/or amplitude of the second harmonic produced. In this case, the second harmonic will have a frequency $w_s$. Accordingly, the output signal providing a read-out of the information stored in the matrix will be compatible with the signal frequency of the carrier wave logic machine. Furthermore, control of the phase of the interrogation voltages derived from the generators 20, 21 and 22 can be effected in order to produce an output signal harmonic having, in addition to the frequency $w_s$, a phase compatible with the carrier wave logic system.

In a particular memory system of the invention which was designed for microwave applications, the generators 20 and 21 were adapted to provide a voltage which may be expressed as:

$$V_1 \sin \frac{w_s t}{2}$$

The generator 22, on the other hand, was designed to provide a voltage 180° out-of-phase and, accordingly, expressible as:

$$V_1 \sin \frac{w_s t}{2} + \pi$$

The read-out voltage across the selected row is therefore an alternating signal of frequency $w_s/2$. The generated second harmonic is of a frequency $w_s$ and of a phase dependent upon the state of the diode.

It is to be understood that the above described arrangements are simply illustrative of the application of the principles of the invention. Numerous other arrangements may be devised by those skilled in the art which embody the principles of the invention and fall within the spirit and scope thereof.

What is claimed is:

1. A memory system comprising a matrix which includes a plurality of X conductive lines and a plurality of Y conductive lines, an individual bistable electrical element bridging each crossing of an X and a Y conductive line in said matrix, each said bistable element having a voltage-current relationship which is characterized by a negative resistance region between two positive resistance regions, the rates of change of slope of said positive resistance regions being opposite in sign, said element being stable in either of said positive resistance regions, read-in circuit means for switching selected ones of said elements from one stable state to the other, and read-out circuit means including voltage means adapted to successively apply a first alternating-current voltage to different ones of said X lines and to apply a second alternating-current voltage to the remainder of said X lines and to all of said Y lines, said first and second alternating-current voltages being equal in frequency but unequal in amplitude, and phase detector means coupled to each of said Y lines, said phase detector means being responsive to the phase of harmonic currents generated in said Y lines by said first and second alternating current voltages.

2. A memory circuit in accordance with claim 1, in which said bistable elements are tunnel diodes.

3. The combination defined in claim 1 wherein said first and second voltages are 180 degrees out of phase with each other.

References Cited in the file of this patent

UNITED STATES PATENTS

| | | |
|---|---|---|
| 2,845,611 | Williams | July 29, 1958 |
| 2,877,359 | Ross | Mar. 10, 1959 |
| 2,907,000 | Lawrence | Sept. 29, 1959 |
| 2,958,074 | Kilburn et al. | Oct. 25, 1960 |
| 2,975,377 | Price et al. | Mar. 14, 1961 |

OTHER REFERENCES

Tunnel Diode as High-Frequency Devices, by H. S. Sommers, Jr., Proceedings IRE, July 1959, pp. 1201–1206.

The Tunnel Diode—Its Action and Properties, by Bernard Sklar, Electronics, November 6, 1959, pages 54–59.